Nov. 27, 1928.
1,693,451
E. G. McCAULEY ET AL
PROPELLER CONTROL MECHANISM FOR REVERSIBLE
OR ADJUSTABLE PITCH PROPELLERS
Filed Oct. 7, 1922
4 Sheets-Sheet 1
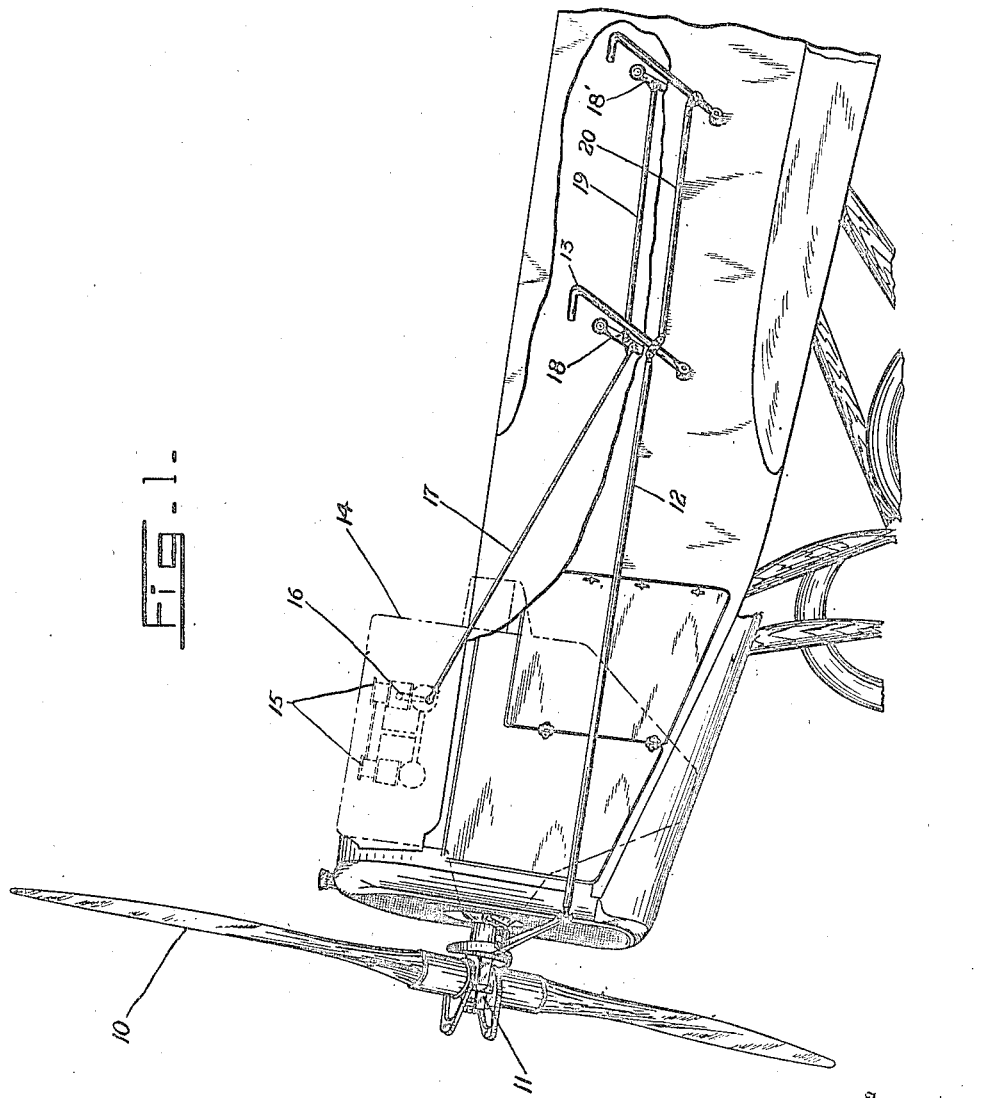

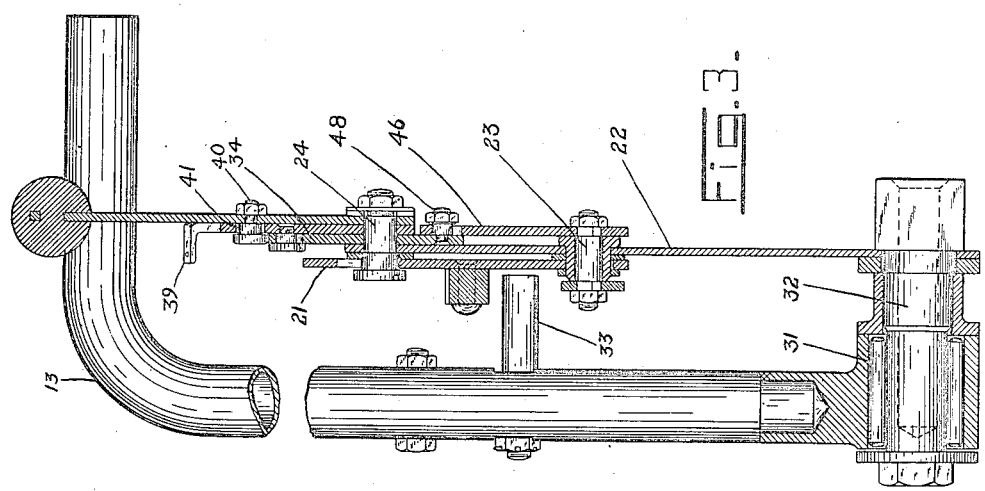
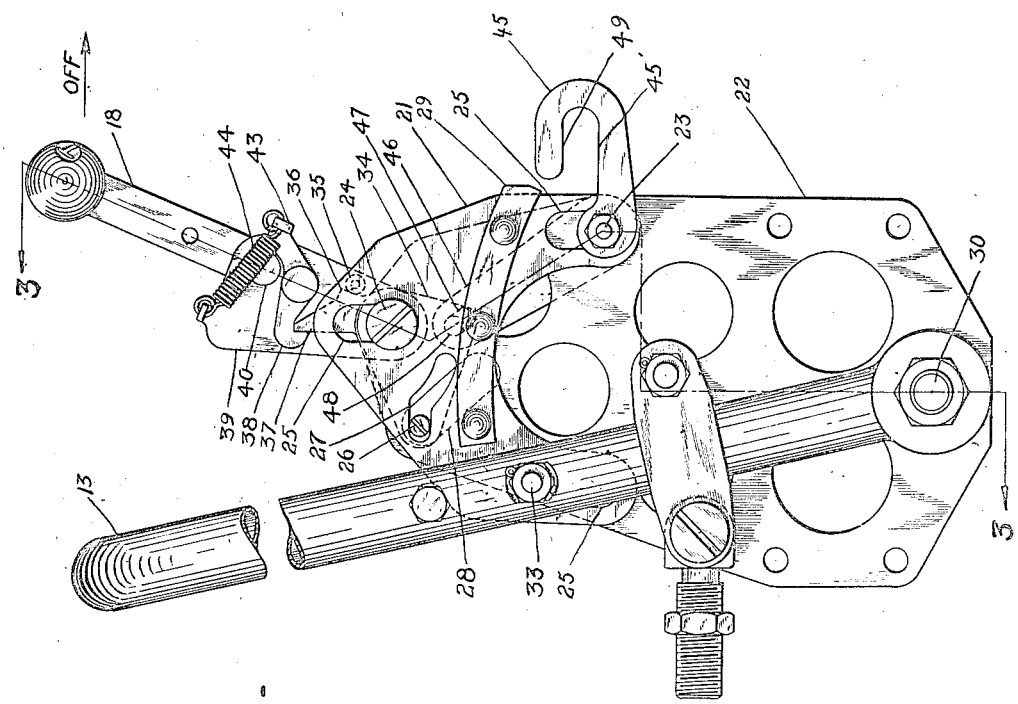

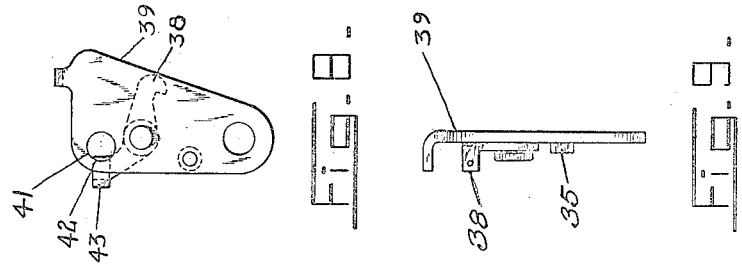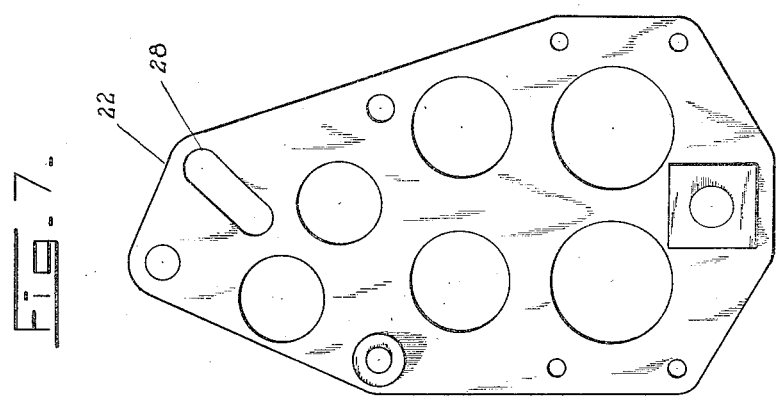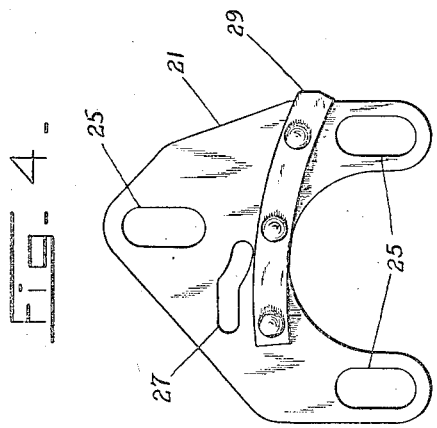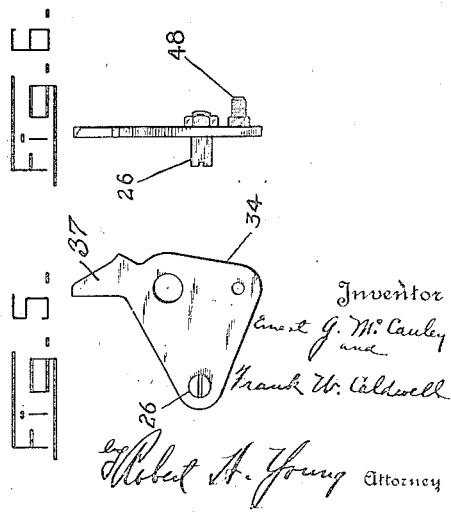

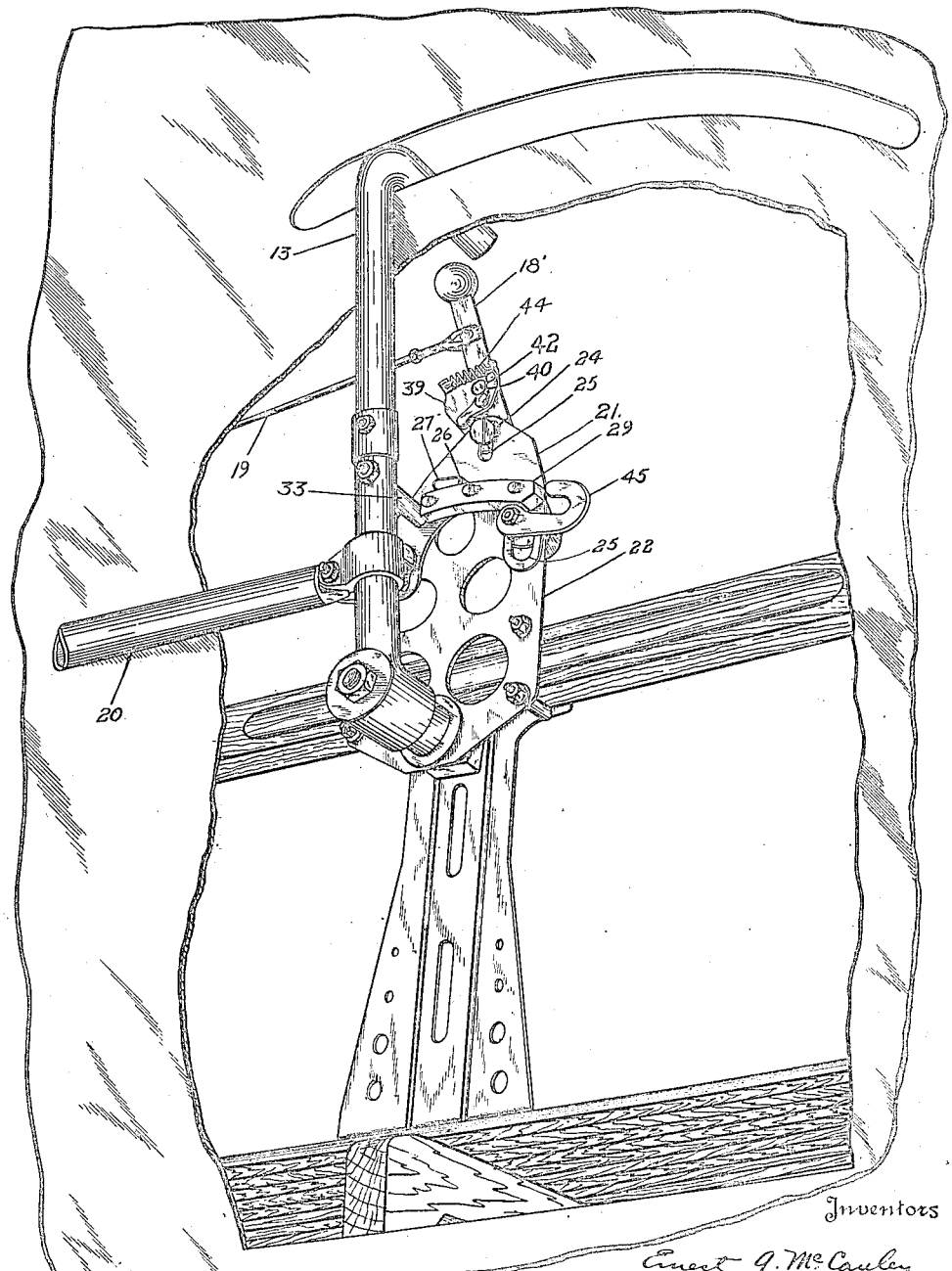

Patented Nov. 27, 1928.

1,693,451

UNITED STATES PATENT OFFICE.

ERNEST G. McCAULEY AND FRANK W. CALDWELL, OF DAYTON, OHIO; SAID CALDWELL ASSIGNOR TO STANDARD STEEL PROPELLER COMPANY, A CORPORATION OF DELAWARE.

PROPELLER-CONTROL MECHANISM FOR REVERSIBLE OR ADJUSTABLE PITCH PROPELLERS.

Application filed October 7, 1922. Serial No. 593,023.

This invention relates to a synchronizing mechanism for aircraft, ship or other craft propelling means whereby a reversible pitch propeller may be controlled together with the throttle valve of the engine or the power means control. More particularly the invention relates to a combined safety device for initial change of propeller pitch and for relatively automatic throttle and pitch control subsequent thereto, to and from a pull reversed pitch position of blades.

It is a prime object of the invention to provide a suitable control mechanism whereby the throttle valve of the engine of the aircraft must be operated manually and primarily to an off position, thereby slowing the engine to an idling speed, before the propeller adjusting mechanism can be operated to change the pitch of the propeller below a minimum safe tractive pitch through a neutral pitch into a reverse pitch position.

It is a further object of this invention to provide a mechanism for automatically throwing on the throttle lever and after the propeller adjusting mechanism has been moved to a full reverse position, thereby opening the throttle valve so that the aviator at the moment of landing will upon merely pulling the propeller adjusting lever, reverse the pitch of the propeller blades and automatically open the throttle valve to speed up the engine. A braking effect is thus provided.

Another object of the invention is to provide means whereby to automatically close the throttle valve upon movement of the propeller adjusting lever toward a neutral from a full reversed pitch position. This may be done prior to or after the airplane has come to a dead stop.

This invention also aims to provide mechanism having a compensating device so arranged that the throttle lever may be manually actuated to the off position at any time, should any parts of the mechanism fail to function, thus providing a safety device whereby the throttle valve is adapted to be closed irrespective of the position of the propeller adjusting mechanism.

Thus it will be seen that the main purpose of the invention is to provide a mechanism of the above mentioned type so that the engine speed or revolutions of the propeller cannot exceed a safe limit while the angularity of the blades or the increase or decrease of the pitch of a tractor propeller is being changed. And further, to provide a positive device to prevent the propeller adjusting mechanism from being moved beyond a predetermined position providing a minimum pitch of the propeller, until the throttle valve of the engine has been moved to idling speed while the pitch of the propeller is further decreased through a neutral pitch into a reverse pitch position.

It will be apparent from the foregoing objects that the mechanism I have devised will make it possible to drive aircraft, such for example as lighter-than-aircraft, backwards.

Furthermore, according to the invention, a dual or multiple control is established to permit operation from either the front or rear cockpits of the aircraft.

Further objects of our invention will be more fully set forth in the following description and claims.

Referring to the drawing:

Fig. 1 is a side view of the device as mounted upon the fuselage.

Fig. 2 is a detail view showing the levers and their mount upon the aircraft.

Fig. 3 is a section view of Fig. 2 on line 3—3.

Fig. 4 is a detail showing the sliding stop plate.

Fig. 5 is a detail showing the lifting plate which operates the sliding stop plate.

Fig. 6 is a side elevation of Fig. 5.

Fig. 7 is a detail showing the main fixed supporting plate upon which the sliding stop plate is mounted.

Fig. 8 is a detail showing the throttle release latch and its supporting plate.

Fig. 9 is a side elevation of Fig. 8.

Fig. 10 is a perspective view similar to Fig. 2 showing the throttle lever in its "on" position and the propellers in pitch for forward flight.

Referring to the drawing by reference numerals, 10 designates a reversible propeller which is associated with a reversing mechanism 11 of any suitable type. This reversing mechanism 11 is actuated by a rod 12 connected to the operating lever 13 which is located in the forward cockpit. The internal combustion engine 14 of the aircraft is provided with carbureters 15 having throttle valve 16 which are connected by means of suitable transmission mechanism 17 to the throttle lever 18 located in the forward cockpit. A similar throttle lever 18' is located in the rear cockpit and connected by means of rod 19 to lever 18. Rod 20 connects the two propeller adjusting levers. The sliding stop plate 21 is mounted upon fixed plate 22 which is bolted in any suitable manner to the fixed part of the fuselage. Sliding movements of stop plate 21 are permitted by the pins 23 and 24 and the slots 25 located in the sliding stop plate. This plate 21 is moved vertically by pin 26 which has a concentric movement about pin 24 and is moved in a manner which will be later described. Pin 26 is movable in a slot 27 in the sliding stop plate, part of the slot 27 being concentric with pin 24 so that movements of pin 26 in this part of the slot will not operate the sliding stop plate. A slot 28 is provided in the fixed plate 22 to prevent interference between pin 26 and plate 22. Sliding stop plate 21 is provided with a radial strip 29 projecting therefrom. This radial strip is concentric about axis 30 about which axis lever 13 is movable. Antifriction rollers 31 are provided between lever 13 and its support 32 which is held by plate 22. A pin 33 projects from the lever 13 toward the sliding stop plate and passes under the radial strip 29 when the throttle control lever is in its "off" position and the sliding stop plate is raised. When the sliding stop plate is lowered it provides a stop, preventing lever 13 from movement to decrease the pitch of the blades beyond a predetermined minimum pitch position.

The manner in which the sliding stop plate is raised or lowered will now be described. Mounted on the opposite side of the fixed plate 22 from the sliding stop plate is an operating plate 34 which is shown in Fig. 5. Plate 34 is pivoted for movement about pin 24 and is provided with a pin 26 so that as plate 34 is rotated to swing the pin 26 downwardly the sliding stop plate is pushed down. A plate 39 is provided with a pin 35 adapted to engage against a projection 36 on the operating plate 34 to rotate plate 34 and moves slide plate 21 down when the throttle lever 18 is moved toward the "on" position in the manner above described. To raise the plate 21 by movement of throttle lever toward the "off" position, a projection 37 on the operating plate 34 is engaged by a hook lever 38 pivotally mounted upon a plate 39, most clearly shown in Fig. 8. This plate 39 is mounted for pivotal movement about pin 24. The throttle lever 18 is provided with a pin 40 extending through hole 41 in plate 39, hole 41 being considerably larger than the pin 40. Upon rearward movement of the throttle lever, pin 40 engages against the stop 42 of the hook lever 38. Part 43 of the hook lever is connected by a spring 44 to the plate 39 as shown in order to normally maintain the hook lever 38 in engagement with the projection on the operating plate 34.

It will thus be seen that as throttle lever 18 is pushed forward to increase the speed of the motor, the operating plate 34 will be pushed by pin 35, and as the lever 18 is pulled rearwardly, pin 40 rotates the hook lever 38 to move the operating plate 34, the spring 44 being strong enough to prevent movement of hook lever 38 upon its pivot under such conditions. If, however, any part of the device fails to function and thus prevent movement of the throttle lever to its "off" position a stronger pull upon the lever will stretch the spring 44, pin 40 moving within hole 41 and release the hook 38 and permit the lever 18 to slow down the motor.

45 is a hook fixed upon pin 23. Upon the opposite side of plate 22 from hook 45 is a lever 46 which is likewise fixed to the pin 23. Lever 46 is provided with a slot 47 and the operating plate 34 provided with pin 48 which operates within the slot 47. Hook lever 45 is adapted to be engaged at point 45' by a pin 33 on lever 13 so as to move hook 45 downwardly when lever 13 is moved from the position shown in Fig. 2 corresponding to the normal pitch of the propellers, to the reverse pitch position. Such downward movement of hook 45, through lever 46 moves the operating plate 34 and through it, the throttle lever 18, so as to speed up the propeller automatically and after the blades have been reversed. Lever 13 may again be moved forward, such action automatically slowing down the motor. This is done by pin 33 pressing upward against part 49 of the hook lever 45, thus operating lever 46 and through it, lever 18.

When the propeller lever 13 is upright and its pin 33 is just beneath radial strip 29 any movement of lever 18 to speed up the motor is prevented.

It will thus be seen that a simple and reliable control mechanism has been provided which can be installed in an aircraft without any special timing of cam devices, the only adjustment necessary being the adjustment to proper length of the control rods and throttle valve rods. The device has been shown in Fig. 10 so mounted that the propeller adjusting lever is on the outside of the fuselage wall, the top part of the rod being bent over to extend within the slot in the fuselage, the throttle lever being mounted on the inside of the fuselage, but it is evident that this arrangement may be departed from if desired.

It will be understood that the particular construction described and shown has been chosen for illustrative purposes merely, and that the invention as defined by the claims hereunto appended may be otherwise embodied and applied without departing from the spirit and scope thereof.

The dual control means shown need not necessarily be identical with one another in all parts; that is, one of the controls may consist of merely a throttle lever and an adjusting and reversing lever. Any suitable means for connecting the dual mechanisms may be employed.

We claim:

1. In a propeller control system, a prime mover, propulsive means connected thereto having a manually controlled means for varying the work done thereby through a restricted arc, a second independent manually controlled means for varying the output of said prime mover and means for rendering operative said work varying means through an unrestricted arc dependent upon the manually controlled means for varying the output of said prime mover.

2. In a propeller reversing system, a prime mover, a propeller connected thereto, a manually operated lever for varying the pitch of said propeller through a restricted arc, a manually operated member for varying the speed of said prime mover and means dependent upon a predetermined position of the manually operated member for varying the speed of the prime mover to render operative said pitch varying lever toward a negative position.

3. In a propeller reversing system, a prime mover, means for controlling the pitch of the propeller through a predetermined arc, means for controlling said prime mover and means rendering said pitch control means operative beyond said predetermined arc in one direction when said prime mover has been brought to a predetermined speed.

4. In an aircraft having a motor provided with a throttle valve in combination, a propeller, manually controlled mechanism for changing the angularity of the blades thereof, independent mechanism for operating the throttle valve and means for preventing the reversing of the pitch of the blades by manually controlled means until the throttle operating mechanism has been manually operated to the idling position.

5. In an aircraft having a motor provided with a throttle valve, in combination, a propeller, mechanism for changing the angularity of the blades thereof, mechanism for operating the throttle valve, and means for preventing the reversing of the pitch of the blades thereof until the throttle operating mechanism has been manually operated to the idling position, said means comprising a device adapted to be moved into the path of movement of the said blade operating mechanism when the throttle control mechanism is moved toward the "on" position.

6. In an aircraft having a motor provided with a throttle valve, in combination, a propeller, mechanism for changing the angularity of the blades thereof, mechanism for operating the throttle valve, and means for preventing the reversing of the pitch of the blades thereof until the throttle operating mechanism has been manually operated to the idling position, said means comprising a device actuated by the throttle control device to prevent movement of the throttle control device toward the "on" position when the propeller blades are near their neutral position.

7. In an aircraft having a motor provided with a throttle valve, in combination, a propeller, mechanism for changing the angularity of the blades thereof, mechanism for operating the throttle valve, and means for preventing movement of the throttle control mechanism to increase the speed of the propeller beyond idling speed when the propeller blades are at relatively small angles of pitch, said means permitting adjustment of the blade operating mechanism.

8. In an aircraft, having a motor provided with a throttle valve, in combination, a reversible pitch propeller mechanism for changing the angularity of the blades thereof, mechanism for operating the throttle valve, and means for preventing any substantial movement of the blade adjusting mechanism to reduce the pitch of the propeller blades beyond a predetermined position when the throttle valve is in the "on" position, comprising a device adapted to be moved into the path of movement of said blade operating mechanism when the throttle control mechanism is moved toward the "on" position.

9. In a propeller reversing system, in combination, a prime mover, a reversible propeller and reversing mechanism therefor, means operable only at or below a predetermined speed of said prime mover to permit operation of said reversing mechanism, and means for automatically varying the speed of said prime mover upon operation of said reversing mechanism beyond a predetermined position.

10. In an aircraft having a motor provided with a throttle valve, in combination, a propeller, mechanism for changing the angularity of the blades thereof, mechanism for operating the throttle valve, and means for preventing the reversing of the pitch of the blades thereof until the throttle operating mechanism has been manually operated to the idling position, a second mechanism for changing the angularity of the blades, a second mechanism for operating the throttle valve and means for connecting said blade adjusting mechanism and said throttle valve mechanisms together to provide a dual control.

11. In a propeller control system, a prime mover, a propeller connected thereto, means for varying the thrust of said propeller, separate means for varying the speed of said prime mover, and means rendering said thrust changing means inoperative beyond a pre-determined position until said prime mover has been brought to a pre-determined speed.

12. In a propeller control system, in combination, a motor provided with a throttle valve, a propeller mechanism for changing the direction of thrust of said propeller, mechanism for operating the throttle valve, and means for preventing the reversing of the thrust of said propeller until the throttle operating mechanism has been operated to cause the motor to resume an idling speed.

13. In an aircraft having a motor provided with a throttle valve, in combination, a propeller, mechanism for changing the speed of said propeller, mechanism for operating the throttle valve, a device operated by said second mentioned mechanism to prevent any movement of said first mentioned mechanism which would cause excessive motor speeds, until the throttle operating mechanism has been operated to cause the motor to resume a safe idling speed.

14. In an aircraft having a motor provided with a throttle valve, in combination, a propeller, mechanism for changing the speed of said propeller, a second mechanism for changing the speed of the motor, a device operated by said second mechanism movable into the path of movement of said first mentioned mechanism to prevent any movement of said first mentioned mechanism which would cause excessive motor speeds, until the throttle operating mechanism has been operated to cause the motor to resume an idling speed.

15. In an aircraft having a motor provided with a throttle valve, in combination, a propeller mechanism for changing the speed of said propeller, mechanism for operating the throttle valve, a stop movable into the path of movement of said first mentioned mechanism by movements of said second mentioned mechanism, to prevent any movement of said first mentioned mechanism which would cause excessive motor speeds until the throttle operating mechanism has been operated to cause the motor to resume a safe idling speed.

16. In an aircraft having a motor provided with a throttle valve, in combination, a propeller, a lever for changing the speed of said propeller, hand means for operating the throttle valve, a support for said lever and hand means mounted on the fuselage, a sliding plate mounted on said support, a stop on said sliding plate, means interconnecting said hand means and sliding plate to move the said stop into the path of movement of said lever to prevent any movement of said lever which would cause excessive motor speeds until the hand means has been operated to close the throttle valve.

17. In an aircraft having a motor provided with a throttle valve, in combination, a propeller mechanism for changing the direction of thrust of said propeller, a second mechanism for changing the speed of the motor, a device operated by said second mechanism movable into the path of movement of said first mentioned mechanism to prevent any movement of said first mentioned mechanism which would cause excessive motor speeds, until the throttle operating mechanism has been operated to cause the motor to resume an idling speed.

18. In an aircraft having a motor provided with a throttle valve, in combination, a propeller, manually controlled mechanism for changing the direction of thrust of said propeller, manually controlled mechanism for operating the throttle valve, a stop movable into the path of movement of said first mentioned mechanism by movements of said second mentioned mechanism to prevent any movement of said first mentioned mechanism which would cause excessive motor speeds until the throttle operating mechanism has been operated to cause the motor to resume a safe idling speed.

In testimony whereof we affix our signatures.

ERNEST G. McCAULEY.
FRANK W. CALDWELL.